United States Patent [19]
Fehrenkamp et al.

[11] Patent Number: 4,545,040
[45] Date of Patent: Oct. 1, 1985

[54] TELEMETRY SYSTEM CABLE

[75] Inventors: William Fehrenkamp; Joe P. Jameson, both of Houston, Tex.

[73] Assignee: AMF Incorporated, White Plains, N.Y.

[21] Appl. No.: 434,292

[22] Filed: Oct. 14, 1982

[51] Int. Cl.[4] ............... G01V 1/22; G01D 5/12
[52] U.S. Cl. ............................................. 367/76
[58] Field of Search ............... 367/20, 76, 78, 79, 367/153, 154, 58; 174/70 R, 71 R; 181/112; 340/853, 858; 333/1, 100, 236

[56] References Cited
U.S. PATENT DOCUMENTS 4,148,006  4/1979  Kelm ........................... 367/76
4,283,778  8/1981  Meyer et al. ................. 367/76

Primary Examiner—Salvatore Cangialosi
Assistant Examiner—K. R. Kaiser
Attorney, Agent, or Firm—David E. Dougherty; John H. Gallagher

[57] ABSTRACT

A modular telemetry cable system having first and second array terminals spaced apart a distance of D. A cable extends between the terminals having X number of analog signal transmission means which is connected to 2X transducer sets for gathering 2X analog signals. The analog signals are processed and transmitted as digital signals over a digital transmission means connected between the terminals. At the location in the cable of the two interior transducer sets, the cable is penetrated to connect the interior transducer sets to the same analog transmission means. The portion of the same analog transmissions means between the two interior sets is disconnected from the two interior sets. At the penetrations in the cable of the two interior sets, the other analog transmission means are cut. One transducer set on opposite sides of the cuts in the other transmission means are connected to each of the other analog transmission means. The cable includes only 2X penetrations in the cable for connecting the transducer sets and providing cuts.

2 Claims, 2 Drawing Figures 4,545,040

TELEMETRY SYSTEM CABLE

BACKGROUND OF THE INVENTION

In conventional land seismic data acquisition systems, the cable used as the analog transmission means become unwieldy when many channels are required. This problem is alleviated by the use of telemetry acquisition systems where the data is processed into digital form before returning it to the collection point or recording point. One type of telemetry system uses a single unit, commonly called an array terminal or AT to process two or more channels of analog data. Cables are used to connect one AT to the next AT and finally to the collection or recording point. The cable containing the digital signals may also be used for the analog signals. As indicated in U.S. Pat. No. 4,148,006, it is desirable to reduce the number of channels of analog transmission means required in which the cable need only have X analog transmission means for 2X transducer sets or analog signals where 2X is the number of signals processed by the individual array terminal AT.

SUMMARY

The present invention is directed to an improvement in a telemetery system cable having first and second array terminals (AT) spaced apart a distance of D, digital transmission means connecting the first and second AT, a cable including X number of analog signal transmission means connected between the first and second AT and 2X transducer sets connected to the analog signal transmission means at distances of D/2X apart. The improvement is directed to transmitting the analog signals of the 2X transducer sets over X number of analog transmission means.

The improvement includes penetrating the cable at the location in the cable of the two interior transducer sets to connect the interior transducer sets to the same analog transmission means. The portion of the same analog transmission means between the two interior sets is disconnected from at least one of the two interior sets. At the penetrations in the cable of the two interior transducer sets, the other analog transmission means are cut. And a transducer set on opposite sides of the cuts in the other analog transmission means penetrate the cable and are connected to each of the other analog transmission means.

Still a further object of the present invention is wherein the cable includes only 2X penetrations for connecting the transducer sets and providing cuts in the cable.

Still a further object of the present invention is wherein the portion of the same analog transmission means between the two interior sets is disconnected from both of the two interior sets.

Other and further objects, features and advantages will be apparent from the following description of a presently preferred embodiment of the invention, given for the purpose of disclosure and taken in conjunction with the accompanying drawing.

DESCRIPTION OF THE PREFERRED EMBODIMENT

While the telemetry system cable of the present invention will be described in connection with its use as a seismic data acquisition system for purposes of illustration, the present cable system may be used in other applications.

Figure 1:
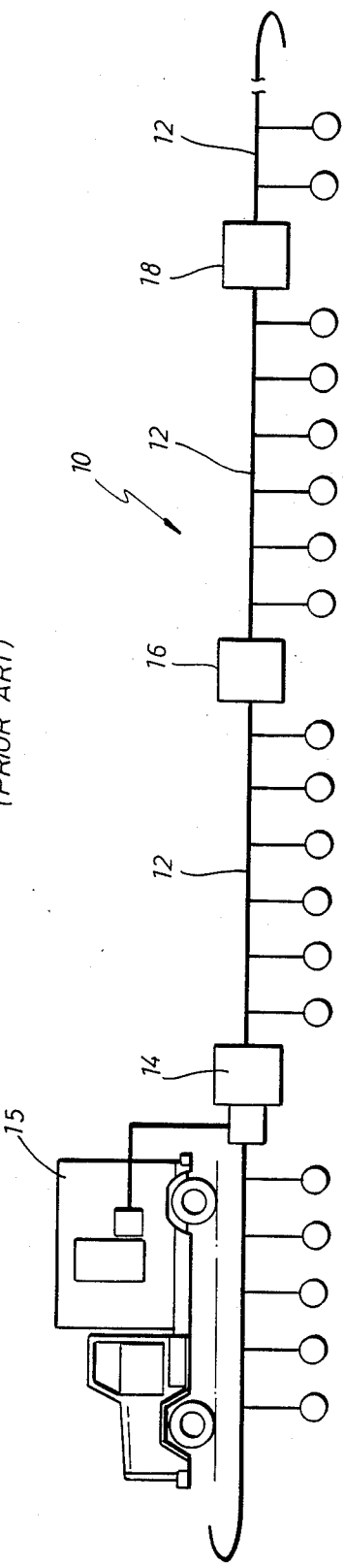
FIG. 1 is a simplified illustration of a conventional land seismic data aquisition system.

Referring now to FIG. 1, the reference numeral 10 generally indicates a conventional land seismic data acquisition system. The cable 12 used in the system 10 includes analog transmission means such as twisted pairs, fiber optic, or coaxial cable, any of which becomes unwieldy when many channels of information are required. This problem is alleviated by the use of telemetry acquisition systems wherein the data is processed into digital form before returning to the collection point or recorder which may be installed in a seismic truck 15. One type of telemetry system uses a single unit, commonly called an array terminal, or AT, to process two or more channels of analog data. The cables 12 are used to connect adjacent AT's to each other and finally to the collection point or truck 15. Thus a plurality of array terminals 14, 16, 18 20 and 22 are spaced apart a distance of D and sequentially connected to each other through the cables 12. The cables are connected to each of two ports in each AT.

Figure 2:
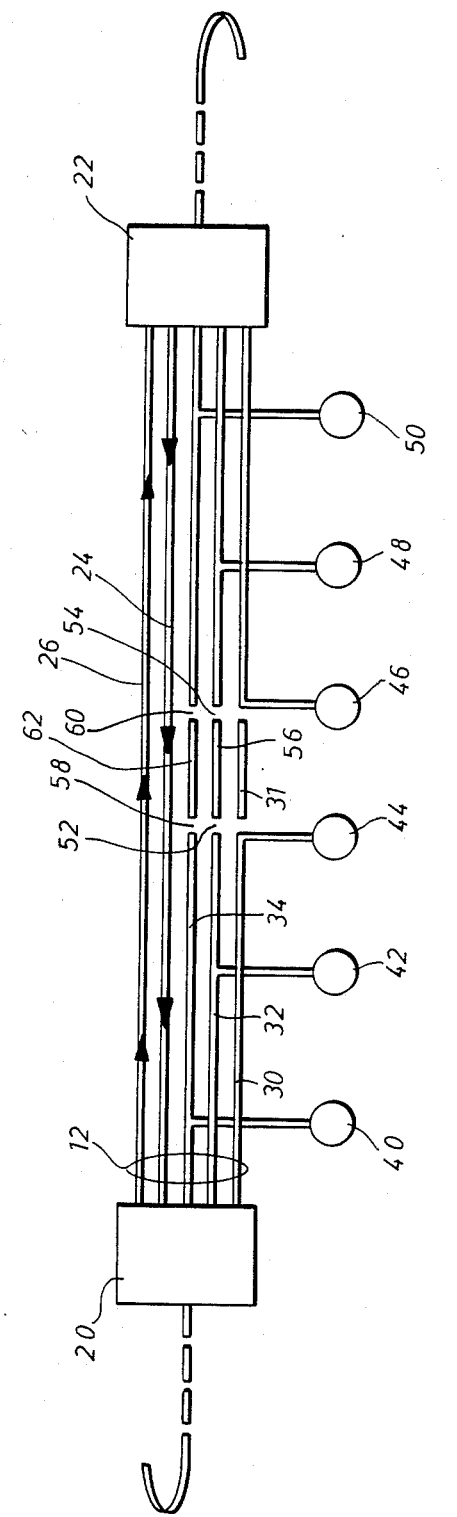
FIG. 2 is a schematic of a cable system of the present invention with a portion expanded to indicate the cable construction.

FIG. 2 shows the section between AT 20 and AT 22 and includes one or more digital transmission lines, here shown as two lines, 24 being the data transmit line and line 26 being the command transmit line. The one or more digital transmission lines 24 and 26 are continuous through the cable 12 between adjacent AT's and are used to transfer data from one AT to an adjacent AT in both directions.

The analog transmission means is included in the cable 12 and for purposes of illustration only is indicated as three analog transmission lines 30, 32, and 34. The number of analog transmission lines is X and X may be any positive integer greater than or equal to two. A plurality of 2X transducer sets, such as geophones or geophone arrays, are connected to particular ones of the analog transmission lines 30, 32 and 34, which will be more fully described hereinafter, and are spaced from each other at a distance of D/2X apart.

However, the present invention provides for the connection of the 2X transducer sets 40, 42, 44, 46, 48 and 50 to the X analog signal transmission means 30, 32 and 34 to allow the cable 12 to transmit 2X analog signals even through a cross section of the cable 12 contains only X analog transmission means.

At the location of the two interior transducer sets 44 and 46, the cable 12 is penetrated to connect the interior transducer sets 44 and 46 to the same analog transmission means. Thus, the interior transducer sets 44 and 46 are connected to analog line 30. That is the pair of transducer means 14 and 46 that is midway within said plurality of transducers 40–50 is connected to the transmission line 30 and that transmission line is cut immediately adjacent those connections on the sides of those connections nearest the center of the cable. However, the portion 31 of the same analog transmission line 30 which extends between the transducer sets 44 and 46 is cut and disconnected from at least one of and preferably from both of the interior sets 44 and 46.

Also, at the penetrations in the cable 12 of the two interior transducer sets 44 and 46, the other analog transmission lines 32 and 34 are cut. Thus line 32 is cut at 52 and 54 leaving a disconnected portion 56. Similarly, line 34 is cut at cut 58 and 60 leaving a disconnected portion 62.

One transducer set on opposite sides of the cut in the other analog transmission lines 32 and 34 penetrate into the cable 12 and are connected to each of the other analog transmission lines 32 and 34. That is, transducer sets 42 and 48 on opposite sides of the cuts 52 and 54 penetrate into the cable 12 and are connected to line 32. Similarly, transducer sets 40 and 50 on opposite sides of the cuts 58 and 60 extend into the cable 12 and are connected to the line 34.

It is to be noted that the connections of the transducer sets and cutting of the cables 30, 32 and 34 are symmetrical and either end of the cable 12 may be connected to either AT 20 or 22. The cable configuration of the connections and cuts insures that the cable 12 has a matched cable load capacitance. This advantageously insures that there is not a mismatch from the transducers which creates an unequal response from the transducers. A further advantage of the particular connections and cuts made in the cable 12 is that the cable 12 requires only 2X penetrations into the cable jacket. This is an advantage which results in reduced assembly cost of the cable 12 and enhanced reliability over arrangements which require a greater number of penetrations of the cable 12. And, of course, the X number of analog transmission lines 30, 32 and 34 gather 2X analog signals. That is, line 30 connects transducer 44 to AT 20 and connects transducer 46 to AT 22. Similarly, line 32 connects transducer 42 to AT 20 and transducer 48 to AT 22. And line 34 connects transducer 40 to AT 20 and transducer 50 to AT 22.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompossed within the spirit of the invention and the scope of the appended claims.

What is claimed is:

1. In a telemetry system cable for connection between first and second array terminals (ATs) spaced apart a distance D, said cable extending between said ATs and including X number of analog signal transmission means, wherein X is a positive integer equal to two or more, the improvement comprising
    a plurality of signal transducer means connected to said cable at 2X locations at distances apart substantially equal to D/2X,
    a pair of said transducer means being connected to each one of the X analog transmission means and positioned thereon substantially symmetrically relative to the ends of the cable,
    the analog transmission means associated with the pair of transducer means midway within said plurality of transducers being cut immediately adjacent the connection of each transducer means on the side thereof nearest the center of the cable,
    the remainder of said analog transmission means also being cut at the same positions thereon as the trnsmission means associated with said midway pair of transducer means, whereby all the analog transmission means, from a respective AT to their cut ends, are substantially equal in length and equal in cable capacitances.

2. In a telemetry system cable for connection between first and second array teminals (ATs) spaced apart a distance D, said cable extending between said ATs and including X number of signal transmission means of equal length wherein X is a positive integer equal to two or more, the improvement comprising
    a plurality of signal transducer means connected to said cable at 2X locations at distances apart substantially equal to D/2X,
    a pair of said transducer means being connected to each one of the X transmissions means and positioned thereon substantially symmetrically relative to the ends of the cable, whereby the transducer means of the innermost pair between said ATs are substantially symmetrical relative to the center of the cable,
    the transmission means associated with said innermost pair of transducer means being cut immediately adjacent the connection of each transducer means on the side thereof nearest the center of the cable,
    the remainder of said transmission means also being cut at the same positions as the transmission means associated with the innermost pair of transducer means, so that the portions of the transmission means that have been cut from their respective transmission means all are of equal lengths, whereby the portions of the transmission means connected to the ATs have substantially equal capacitances.

* * * * *